June 17, 1941.  M. OLLEY  2,245,809
AUTOMOBILE SUSPENSION SYSTEM
Filed April 16, 1936   2 Sheets-Sheet 1
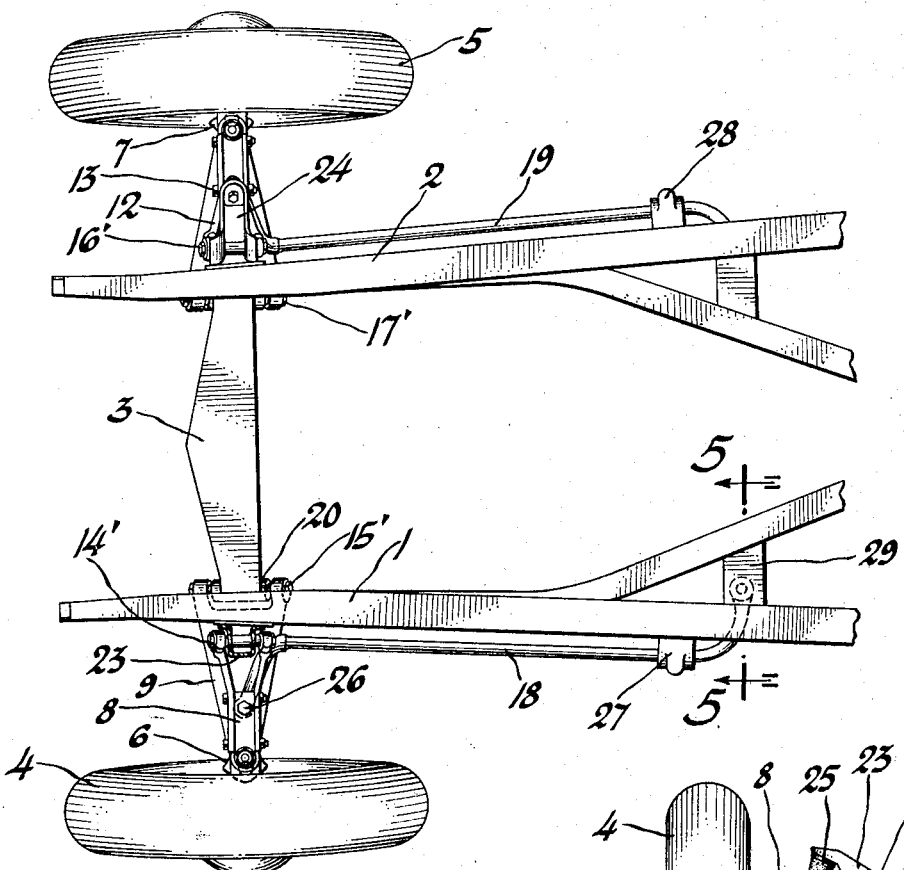
Fig. 1
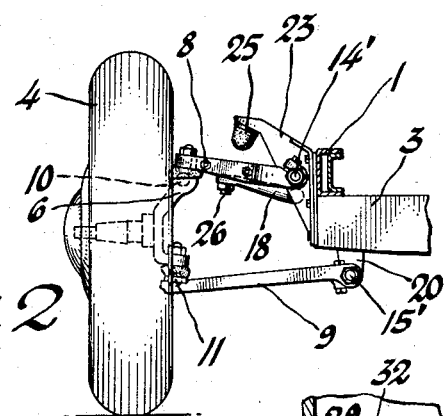
Fig. 2
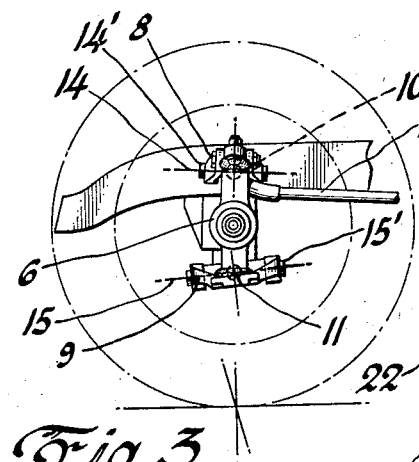
Fig. 3
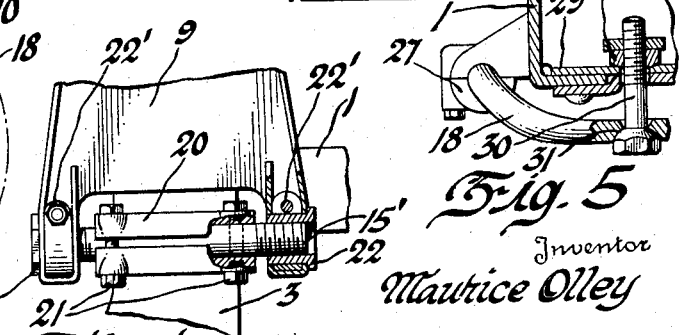
Fig. 4
Fig. 5
Inventor
Maurice Olley
By Blackmore, Spencer & Flint
Attorneys Inventor
Maurice Olley Patented June 17, 1941

2,245,809

UNITED STATES PATENT OFFICE 2,245,809

AUTOMOBILE SUSPENSION SYSTEM

Maurice Olley, Detroit, Mich., assignor to General Motors Corporation, Detroit, Mich., a corporation of Delaware Application April 16, 1936, Serial No. 74,611

4 Claims. (Cl. 267—57)

This invention relates to vehicles having independent suspension of a pair of road wheels of that type in which each wheel is resiliently supported from the vehicle frame, at the outer ends of a pair of laterally extending links which are pivoted one above the other to the frame of the vehicle.

More particularly, the invention relates to motor vehicles having independent suspension of the foregoing general type applied to dirigible front wheels.

Normally, the laterally extending links are pivoted about axes parallel to the ground, and when at the same time these axes are parallel to the longitudinal axis of the vehicle and the wheel is deflected relatively to the vehicle, an assumed fixed point on the wheel (e. g., the point of contact of the tire with the road) is deflected relatively to the vehicle, in a vertical plane normal to the longitudinal axis of the vehicle.

In such a vehicle, application of the brakes normally results in a deflection of the ends of the vehicle in contrary directions relatively to the road, due to the transfer of mass from one end towards the other end of the vehicle, consequent upon braking deceleration. Relative deflections opposite in direction obviously occur when the vehicle is accelerated.

Upon braking when the vehicle is going in a forward direction there is a downward dive of the front end and an upward lift of the rear end of the vehicle relatively to the road. These deflections of the front and rear ends of the vehicle are reversed if the vehicle is going in a rearward direction.

The object of the invention is to reduce the extent to which a vehicle having the aforesaid general type of independent suspension of a pair of road wheels, dives or lifts relatively to such independently suspended road wheels or to the road upon braking deceleration in one or both directions of motion of the vehicle.

It is a more specific object of the invention to reduce the degree of "dive" or downward deflection of the front end of a vehicle, having the aforesaid type of independent suspension of the dirigible front wheels, upon braking deceleration when the vehicle is going forwardly.

A still further object of the invention is to effect the last named object with a construction in which the center of the wheel moves upwardly or downwardly in a direction as nearly as possible parallel with the center line of the king pin in its normal load position, upon any deflection of the road wheels relatively to the vehicle.

The above and other objects of the invention will be apparent as the description proceeds.

It has been found that when an assumed fixed point on the wheel moves at an angle longitudinally of the vehicle, in a direction outwardly and upwardly away from the vertical transverse plane of the center of gravity of the vehicle upon any actual upward deflection of the wheel and vice versa upon a downward deflection thereof—which deflections may be due for instance to a change in the load on the vehicle or to the passing of the wheel over a bumpy road surface—those deflections due to braking deceleration and causing diving or lifting of one or both ends of the vehicle can be very considerably reduced in magnitude, at least in one direction of deceleration and to a lesser extent in both directions of deceleration. This is so because with such a construction, the decelerating force acting longitudinally of the vehicle gives rise to a force component opposing the force tending to cause the diving or lifting deflection.

By suitable selection the aforesaid angle of movement of an assumed fixed point on the wheel (e. g., the point of contact of the tire with the road) can be such that there is neither an upward nor a downward deflection of one or both ends of the vehicle in one direction of maximum deceleration (e. g., in forward braking) assuming a given constant coefficient of rolling friction of the tires on the road.

According to the copending application S. N. 31,830, the required direction of movement of the point of contact of the tire with the road was obtained by inclining the pivot axes of the upper and lower links or arms on the frame, at equal angles outwardly and downwardly away from the vertical transverse plane of the center of gravity of the vehicle, so that both arms moved in parallel planes at an angle to the vertical.

According to the present invention the required direction of movement of the point of contact of the tire with the road is obtained by inclining the pivot axes of the upper and lower links on the frame so that they are divergent, sloping, longitudinally of the vehicle, respectively upwardly and downwardly away from the vertical transverse plane of the center of gravity of the vehicle, in spaced, parallel, vertical planes, whereby upon upward or downward deflection of the wheel, the center thereof moves along a path very nearly parallel (as measured in a plane longitudinally of the vehicle) with a line passing through the centers about which the wheel supporting means is pivotally connected to the transversely extending upper and lower links in their normal load position, while the point of tire contact moves very nearly in a straight line, at the required angle from the vertical.

Not only is the brake dive or lift thus reduced, but this is achieved with a construction in which, in the case of dirigible wheels, there is, with any upward or downward deflection of the wheels relatively to the vehicle, a minimum change in the moment of the wheel mass about the king pin as compared with the structure of copending application S. N. 31,830 for example, in which, with deflection there is a considerable change in the moment of the wheel mass about the king pin, which may cause wheel fight.

A construction according to the present invention reduces the possibility of wheel fight and greatly improves the steadiness of the steering.

There is only a small change in the caster angle of the king pin with deflections of the wheel and there is the advantage that this is in such a direction that as the car pitches or dives, the caster angle relative to the ground tends to stay constant.

It will be noted also that when the vehicle rolls in cornering the caster angle of the outer more heavily loaded wheel tends to increase, so that the normal load caster angle need be very slight.

The drawings show one example of a construction according to the invention applied to the front dirigible wheels of a motor vehicle. In this case the pivot axes of the upper and lower links slope upwardly and downwardly respectively towards the front end of the vehicle.

In the drawings:

Figure 1 shows in plan view, the front end of a motor vehicle chassis with independent suspension of the dirigible road wheels according to the invention.

Figure 2 is an end elevation.

Figure 3 is a side elevation.

Figures 4 and 5 are enlarged part sectional views of details of Figures 1, 2 and 3.

Figure 6:
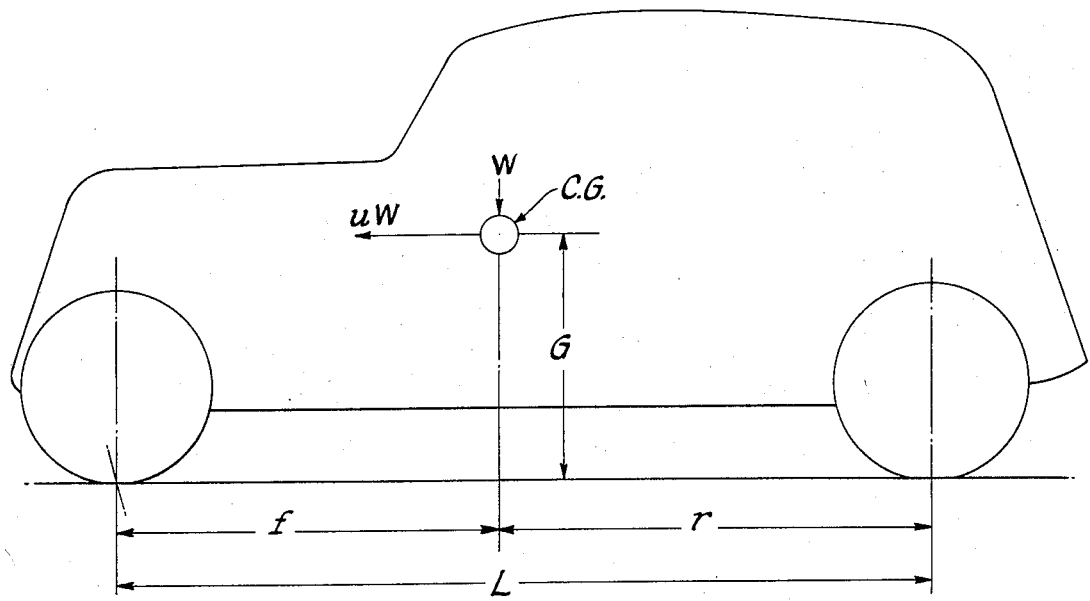
Figures 6 and 7 are diagrammatic views showing the factors involved in the upward or downward movement of the front end of the vehicle relatively to the wheels as a result of braking deceleration.

In Figures 1 to 5, 1 and 2 are the side members of the frame which is provided with a cross member 3.

The dirigible road wheels 4 and 5 are each carried on wheel supportinng members 6 and 7 respectively.

The wheel supporting member 6 is mounted between the outer ends of a pair of laterally extending links 8 and 9, through the medium of ball and socket connections 10 and 11 respectively, and itself constitutes a "king pin" for the wheel 4, having an axis passing through the centers 10 and 11 with a certain caster angle. The wheel supporting member 7 similarly constitutes a "king pin" for wheel 5 mounted between a pair of laterally extending links 12 and 13.

The links 8, 9, and 12, 13 are V shaped in plan and those of each pair are pivoted one above the other to the frame about axes 14, 15, and 16, 17 respectively, the axes of the upper and lower links being divergent, longitudinally of the vehicle, sloping respectively upwardly and downwardly away from the vertical transverse plane of the center of gravity of the vehicle, (as seen most clearly in Figure 3) while being in spaced, parallel, vertical planes.

Torsion rod springs 18 and 19, connected respectively between the upper links 8 and 12 and the vehicle frame, resiliently restrain swinging movement of the linkages in a generally upward direction relatively to the vehicle frame.

The pivot axes 15 and 17 of the lower links 9 and 13 are constituted by threaded pins as shown for instance in Figure 4, which is a view from below, of a part of the frame and the lower link 9, partly in section. The pin 15' threaded at its ends, is clamped in the bracket 20 on the frame cross member 3 by bolts 21. The link 9 is a sheet steel stamping with parts welded thereto and is provided with eyes for bushings 22 threaded internally for screw-threaded bearing engagement with the pin 15'. In assembly the link 9 is positioned over the pin 15', the bushings 22 are screwed into position thereon and then clamped to the link 9 by bolts 22'.

The upper links 8 and 12 are similarly mounted on threaded pins 14' and 16', which are welded or otherwise suitably mounted in brackets 23 and 24 attached to the frame and extended over the upper links 8 and 12 to carry rubber stops such as 25, resiliently limiting the upward deflection of the links. As shown in Figure 1, the upper portion of the bracket 23 has been broken away more clearly to show the welding of the pin 14 therein.

The torsion rod springs 18 and 19 have cranked portions attached to the upper links 8 and 12 respectively by bolts such as 26, and extend rearwardly therefrom through "bearings" 27 and 28 respectively on the vehicle frame, in which they are tightly clamped and rigidly held after adjustment so that in operation there is no rubbing friction between the rods and the "bearings" or any other parts.

The rearward ends of the rods are cranked and adjustably connected to the vehicle frame in the manner shown in Figure 5, wherein the rod 18 is connected to the frame member 29 by a link 30. The head of the link 30 has a spherical seating 31 in the rod 18, and the nut 32 on the link 30 has a spherical seating on the frame member 29. It will be seen that the length of the link 30 and hence the torsional deflection of the torsion rod spring for a given wheel deflection may be adjusted by screwing or unscrewing the nut 32 on the link 30.

Although the rod 18 is substantially coaxial with the axis of the link 8 to which it is attached, it is not exactly so, and upon upward or downward deflection of the wheel, there will thus be a degree of bending as well as twisting of the rod, but this will not interfere with its function.

Steering movement of the wheels 4 and 5 about "king pin" axes such as 10, 11 can be effected and controlled by any suitable steering gear and linkage (not shown).

Figure 7:
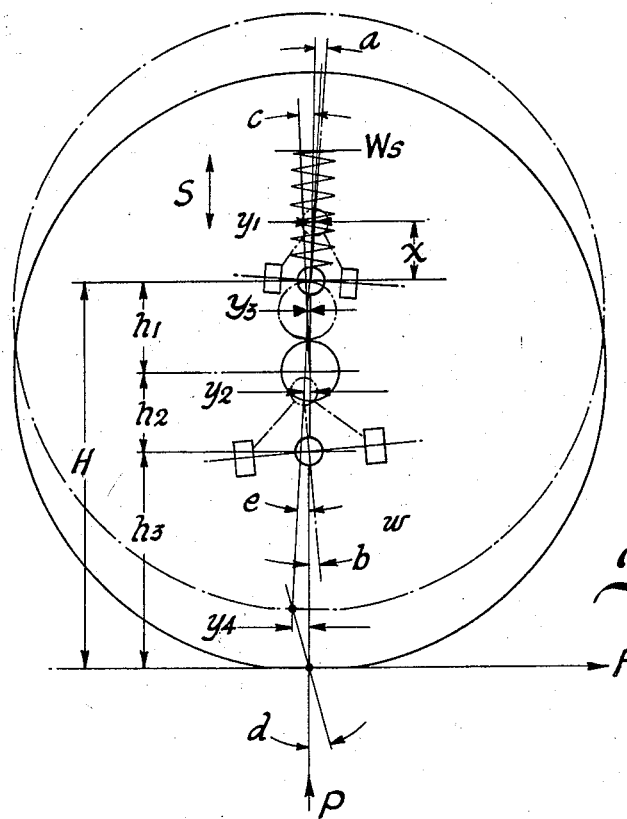

Referring now to Figures 6 and 7 it has been shown in copending application, S. N. 31,830, that If $x$=the distance which the wheel lifts or drops relatively to the vehicle,
$S$=the spring rate of both wheels combined (assumed constant),
$Ws$=spring load on the wheels,
$F$=the tractive force,
$P$=the tire contact load,
$w$=the unsprung weight,
$d$=the angle which the path of movement of a fixed point on the tire makes with the vertical in a plane parallel to the longitudinal axis of the vehicle, $u$ = the coefficient of rolling friction,
$W$ = the weight of the car,
$uW$ = the deceleration force,
$G$ = the height from the ground of the center of gravity,
$L$ = the wheelbase,
$f$ = distance between the transverse vertical planes of the front wheels and the center of gravity,
$r$ = distance between the transverse vertical planes of the rear wheels and the center of gravity, $$x = \frac{u}{S}\left(\frac{WG}{L}(1 - u \tan d) - \tan d \frac{Wr}{L}\right)$$

or $$\tan d = \frac{1 - \frac{S \times L}{uWG}}{\frac{r}{G} + u}$$

In the formulae, $u$ can be assumed positive in forward braking and negative in rearward braking. A positive value of $x$ will then represent "dive" of car and a negative value of $x$ will represent "lift" of car.

In a specific example in which $S = 220$ lbs. (110 lbs. per inch per wheel)
$L = 112''$
$G = 25.5''$
$W = 3820$ lbs.
$r = 50''$ and assuming a maximum value of $u = .8$ the deflection $x$ (in inches) will change for different angles $d$ in the manner shown in the following table A.

| Angle $d$ | Tan $d$ | $x$ in forward braking | Deflection in forward braking | $x$ in rearward braking | Deflection in rearward braking |
|---|---|---|---|---|---|
| 0° | 0 | +3.16 | 3.16" dive | −3.16 | 3.16" lift. |
| 15° | .268 | +.822 | .822" dive | −2.18 | 2.18" lift. |
| 20° | .362 | +.00 | .00" | −1.8 | 1.8" lift. |
| 26½° | .5 | −1.335 | 1.335" lift | −1.2 | 1.2" lift. |
| 35° | .7 | −3.2 | 3.2" lift | −.69 | .69" lift. |
| 41° | .863 | −4.4 | 4.4" lift | −.00 | .00" lift. |
| 45° | 1.00 | −5.6 | 5.6" lift | +.525 | .525" dive. |

The amount of brake dive or lift depends on the angle $d$ and is not influenced by any of the details of mechanism by which such an angle is obtained.

Referring now to Figure 7 in which the position of the parts is shown in full lines before upward deflection of the wheel relatively to the vehicle and in broken lines after deflection through a distance $x$.

Where $a$ = angle of movement of upper ball from vertical,
$b$ = angle of movement of lower ball from vertical,
$c$ = angle of movement of wheel center from vertical,
$d$ = angle of movement of tire contact from vertical,
$e$ = angle of tilt of king pin center line,
$h_1$ = height of upper ball from wheel center,
$h_2$ = drop of lower ball from wheel center,
$h_3$ = height of lower ball from ground,
$x$ = vertical deflection of wheel,
$H$ = height of upper ball from ground.

Then, neglecting variations in the various heights due to angularity, since the angles are small, $$y_1 \cong ax$$

$$y_2 \cong bx$$

$$e \cong \frac{y_1 + y_2}{h_1 + h_2} = x \cdot \frac{a+b}{h_1 + h_2} \quad (1)$$

$$y_3 = y_2 - eh_2 = x \cdot \frac{bh_1 - ah_2}{h_1 + h_2}$$

$$c \cong \frac{y_3}{x} = \frac{bh_1 - ah_2}{h_1 + h_2} \quad (2)$$

$$y_4 = y_2 + eh_3 = x \cdot \frac{bH - ah_3}{h_1 + h_2}$$

$$d = \frac{y_4}{x} = \frac{bH + ah_3}{h_1 + h_2} \quad (3)$$

If now, for example, we make $a = 3½° = .0611$ radians
$b = 5° = .0872$ radians
$h_1 = 4.25''$
$h_2 = 3.75''$
$h_3 = 10''$ $$e \text{ (per inch)} = \frac{.0611 + .0872}{4.25 + 3.75} = .0185 \text{ radians} = 1.06° \quad (1)$$

$$c = \frac{.0872 \times 4.25 - .0611 \times 3.75}{8} = .0176 \text{ radians} = 1.01° \quad (2)$$

$$d = \frac{.0872 \times 18 + .0611 \times 10}{8} = .273 \text{ radians} = 15.65° \quad (3)$$

The paths of wheel center and tire contact are very close to straight lines.

The rate of change of caster is thus approximately 1° per inch of deflection $x$.

The wheel center moves at approximately 1° from the vertical.

The tire contact moves at approximately 15½° from the vertical.

In the case of a vehicle having the weights and dimensions for which table A was calculated, a path of movement of the point of tire contact at approximately 15½° from the vertical would limit the brake dive in forward braking to approximately ¾" maximum.

The very small angle of 1 degree between the motion of the wheel center and vertical is insufficient to cause wheel fight, while the rate of change of caster is small and in such a direction that as the car dives the caster relative to the ground tends to stay constant.

I claim:

1. In a vehicle having an independent suspension of a pair of road wheels of which each road wheel is mounted on a wheel support member which is pivotally mounted between the outer ends of upper and lower laterally extending links, fixed determinate pivot axes for the inner ends of said upper and lower links on the vehicle frame, said pivot axes being divergent in a direction away from the vertical transverse plane of the center of gravity of the vehicle, and a torsion rod spring resiliently restraining upward pivotal movement of the links, said torsion rod spring being arranged longitudinally of the vehicle and having cranked end portions through which it is respectively connected to one of the links and to the vehicle frame.

2. The combination according to claim 1, in which the cranked end portions of the torsion rod spring are respectively connected to the upper link and to the vehicle frame.

3. The combination according to claim 1, in which the connection between one of the cranked end portions of the torsion rod spring and the part to which it is connected is adjustable to vary the torsional deflection of the spring for a given deflection of the wheel, a "bearing" being provided in which the rod is clamped and rigidly held to the part to which it is adjustably connected, after the adjustment has been made.

4. The combination according to claim 1, in which the cranked end portions of the torsion rod spring are respectively connected to the upper link and to the vehicle frame, the connection between one of the cranked end portions of the torsion rod spring and the part to which it is connected being adjustable to vary the torsional deflection of the spring for a given deflection of the wheel, a "bearing" being provided in which the rod is clamped and rigidly held to the part to which it is adjustably connected, after the adjustment has been made.

MAURICE OLLEY.